Feb. 16, 1971     L. R. SPERBERG     3,563,088

NON-DESTRUCTIVE METHOD OF DETERMINING TIRE LIFE

Original Filed Sept. 12, 1966

*INVENTOR.*
LAWRENCE R. SPERBERG
*BY*
MARCUS L. BATES

United States Patent Office 3,563,088
Patented Feb. 16, 1971

3,563,088
NON-DESTRUCTIVE METHOD OF DETERMINING TIRE LIFE
Lawrence R. Sperberg, 6740 Fiesta Drive,
El Paso, Tex. 79912
Continuation of application Ser. No. 578,707, Sept. 12, 1966. This application July 14, 1969, Ser. No. 847,778
Int. Cl. G01m 17/02
U.S. Cl. 73—146
14 Claims

ABSTRACT OF THE DISCLOSURE

A non-destructive method of determining the durable life of a tire by measuring the lateral and radial force variations exhibited by the tire. A series of similar tires are measured for their force variations, and subjected to usage in order to determine the effect of the force variations upon the durable life characteristics of the series. The force variations exhibited by the tire are compared to the data obtained from the series of tires in order to non-destructively determine the life of the tire.

CROSS REFERENCE TO RELATED APPLICATIONS

Ser. No. 814,233, filed Apr. 4, 1969 which is a continuation-in-part of Ser. No. 601,275, filed Nov. 21, 1966 and now abandoned, and to which reference is made for further background of the invention.

Ser. No. 578,707, filed Sept. 12, 1966, now abandoned, of which this application is a direct continuation.

BACKGROUND OF THE INVENTION

This invention relates to testing and to the control of manufacture of tires, and in particular to the testing and evaluation of pneumatic vehicle tires for their wear and durability characteristics.

In order to fully understand the present invention, it is necessary to discuss some of the factors which influence the useful life of a tire being terminated.

Tire life is terminated by three principal causes: (1) the tire is damaged in use by some external source generally referred to as a road hazard; (2) the tire is structurally deficient; and (3) the tire is removed from service with the tread worn away but with the tire body intact. Road hazard failures generally fall into the category of cuts or bruise breaks. Structurally deficient tires cover the entire gamut of deficiencies ranging from gross to infinitely small. It is the opinion of many technically oriented tire experts that it is a virtual impossibility to build absolutely perfect tires. Therefore tires that have gross deficiencies resulting from some mishap in the manufacturing operation fail at an early mileage with little tread being worn away, and with the exact cause of failure being readily identifiable. Other tires with smaller deficiencies due to manufacturing mishaps or to minor improper design characteristics fail at higher mileages and with appreciable tread still remaining. The remainder of the tires that fail with very little tread remaining are generally said to have died of old age, but in reality their cause of failure can be attributed to some minor structural deficiency that required a good many miles before the effect of the deficiency became evident on the failure mechanism.

Old age failures of tires are almost universally due to separations occurring within the tire. A separation type failure simply denotes a failure wherein the tread separates from the tire body or wherein the individual plies of the tire body separate from each other.

A tire that fails when the tread lifts up from the cord body is generally referred to as a "tread separation" or most generally, simply as a "separation." A tire that fails due to the individual cord planes separating from each other is generally referred to as a "ply separation." A ply separation may occur in the sidewall, the shoulder, the crown, or the bead. If a ply separation occurs at or near the bead within the bead turn-up area, it is generally referred to as a "bead separation."

Separations may occur between rubber interfaces, or they may occur at the interface between the cord and the rubber insulation compound. Since practically all tire cord is dipped, or treated in some manner where the treating agent penetrates between the individual fibers making up the cord to thereby provide an effective bond between the cord itself and the rubber insulation or body compounds, when separations occur between the interface of the cord and the rubber insulation compound, the separation is generally referred to as a dip coat or skim coat separation. Separations of this type are characterized by the cords themselves appearing bright and with a minimum of rubber compound adhering thereto.

All old age separations in tires start from the inside air chamber and work out to the tire surface and are due principally to the deterioration of the elements of the tire body that include the rubber compounds employed, the cord, the cord surface treatment that helps to bond the rubber insulation compound to the cord itself, the tread compound itself, and the liner compound or inner tube whose initial main objective is simply to contain the gaseous inflating agent.

Tires, while looking all alike, are actually quite distinct and different from each other. It is these differences that affect and influence the ultimate results of even the most carefully controlled road wear and durability test, or indoor wheel durability test. The differences between like tires are best appreciated by examining the force variation curves that characterize each tire. The specific force variation curves (radial and lateral) encompassing the 360° circumference of a tire represent the composite end result of all of the factors entering into the design and manufacture of the tire. Each tire has its own characteristic or fingerprint that denotes the tire's deviation from being perfect. As a tire rotates, under a given applied load, tire uniformity machines measure the non-uniformity of the tire, or the change in the radial and lateral force variations. Lateral forces resolve into two sub-components—the strict lateral force variations due to tread irregularity and the conicity effect which results from an unbalanced cord planograph. It is possible to examine force variation charts and foretell with accuracy the relative wear rates of any section of the tire in comparison to any other section and also to foretell with accuracy the most probable point at which the tire will fail when the tire dies of middle or old age. Radial force variation curves show the change in load as the tire rotates. For example, the test may be conducted on a passenger tire with an effective load of 1000 pounds. The total radial force variation for the particular tire in question might be 28 lbs. The effective load at any particular tread arc of the tire thus varies, for example, from 986 lbs. to 1014 lbs. for a symmetrical non-uniform tire, or from 995 lbs. to 1023 lbs. for an unsymmetrical non-uniform tire, dependent upon the peculiarities of the imperfection. Similarly, a lateral force variation of 12 lbs., for example, might be uniformly distributed with 6 lbs. on either side of the neutral axis which the tire tends to follow, or the entire 12 lbs. might tend to pull the tire to the left or to the right of the neutral axis for the entire extent of the 12 lb. variation.

An unbalanced cord planograph (example: a 34° cord angle in one direction and a 35° cord angle in the other direction) will cause a tire to pull in one direction, resulting in a wiping wear from one shoulder to the other as if the tire had been toed in or out. The conicity wear effect exists generally for the entire circumference while the tread irregularity effect varies around the tire circumference.

Applicant has found that the absolute rate of wear of tires that are tested under carefully controlled and regulated conditions is essentially proportional to the absolute magnitude of the radial and lateral force variations. Large force variations result in rapid rate of wear in comparison to small force variations which give slower rates of wear. Not only does the force variation data foretell the relative wear rate and durability to be anticipated, they also indicate the change in the rate of wear occurring circumferentially around the tires as well as the specific point of most probable failure. Specifically, whenever the radial force is increasing the wear rate increases to the maximum when the radial force begins to decrease, and this is followed with a decrease in the rate of wear paralleling the decrease in the radial force. It is further noted that the rate of change of the force variation also has a marked influence upon the absolute rate of wear—the greater the rate of force increase, the greater or faster the rate of wear; and the more rapid the drop in the force variation, the more slowly is the rate of wear. A tire having a 28 lb. force variation that is more or less symmetrical in the form of a sine wave for the 360° circumference wears at a somewhat slower rate than a similar tire also showing a 28 lb. absolute force variation where the 28 lb. force variation is concentrated in a small segment of the tire periphery. Lateral force variation (tread irregularity) is less important than radial force variation in influencing the absolute rate of wear, and is additive with radial force variation. Conicity lateral force wear is independent of and additive to radial force variation wear. When radial force variation is increasing, the influence of a lateral force variation, simultaneously with an increase in the radial force variation, results in a faster rate of wear than if there had been no lateral force variation at all. Similarly, when the radial force variation is decreasing, the influence of a simultaneous lateral force variation is minimized. The slope, acceleration or deceleration, of the force variation curve is the major factor in influencing the absolute rate of wear and is also the major factor in determining the precise location where the tire is most apt to fail. At points where the force variation is changing rapidly, there is a maximum energy change which results in a local hot spot which hastens the oxidative deterioration of the elements of the tire which in turn will cause the tire to fail at this point. Thus, an analysis of a failed tire in an area adjacent to the failed area may not reveal anything amiss with the cord, cord dip, or body compounds that have been employed in the tire's manufacture. When making comparisons of different type or construction tires, for either wear or durability, it is essential that similar tires be compared. That is, they must be similar in their basic radial and lateral force variation curves, not only in terms of absolute force variation, but also in terms of the rate of change of the force variation within the 360° circumference of the tire. This is particularly true for the durability characteristic of a tire, where variations in the acceleration or deceleration of forced change have a more pronounced effect upon durability than upon absolute rate of wear.

As a tire rolls it flexes at the contact area with the road and this flexing action generates heat. The heat balance within the tire depends upon the amount of flexing which regulates the quantity of heat generated, the hysteresis quality of the tire itself, the thermal conductivity of the rubber-cord material, and the heat transfer coefficient at the tire surface where heat is disseminated. The gas chamber of the tire thus not only becomes the reservoir that stores the inflating agent, but also the reservoir that involuntarily stores the heat that is generated as a consequence of the tires flexing. The influence of the heat is therefore greatest within the band ply of a tire and specifically at the flux area where the heat is generated. Tire failures due to old age are invariably the result of oxidative deterioration which is governed by the amount of oxygen present and the effective temperature. The actual point of failure within the tire depends upon the forces and stresses existent and quite obviously occurs at the weakest point within the tire. This may occur at the cord-rubber bond, between plies of the cord body, or between the tire tread and the cord body. A tire having a minor standard defect such as represented by a small radial and/or lateral force variation as measured on a conventional tire uniformity machine will generate slightly more heat at the point of imperfection (a local hot spot) which augments the oxidative degradation that in turn causes the failure to occur more quickly at this specific point of imperfection rather than at other points where the imperfections are of a lesser nature.

In a pneumatic tire, the area of the trend which is in moving contact with the road surface is subjected to wear due to the abrasion of the road surface against the tread wearing compound. As pointed out in the above patent applications, an important factor that has a marked influence upon the absolute wear rate of a tire as well as its durability is the degree of imperfectness that characterizes the tire. A tire that is perfectly balanced, all of the stresses perfectly distributed around and throughout the tire, the interior and exterior radial runout perfect, and whose lateral and radial force variations are zero, or close thereto, will give the ultimate in wear performance and tire life durable characteristics for that specific tire design and construction. The dynamic flexibilities of such a hypothetical tire would be considered perfect or nearly so. The introduction of any of the above elements that impart various degrees of imperfectness to the tire result in an overall faster rate of wear, along with an uneven rate of wear around the tire where the rate of wear in any specific length on the tire surface is regulated by the dynamic flexibility existent in that particular length. In addition, the introduction of any element that contributes to tire non-uniformity may have an immediate and adverse effect upon the tire durability by causing the tire to fail before it has a chance to wear bald. Accordingly, an imperfect tire will mask, or obscure, the tire wear quality of the rubber tread composition regardless of how well the conditions of the wear-test may be controlled. Furthermore, the wear-test itself may be jeopardized by premature failure of the tire due to the built-in imperfectness, causing the experimenter to draw incorrect conclusions as to the wear and durability properties of a tire, or the changes wrought by effecting a change in the structure or construction of a tire.

"Tire durability" is a measure of tire life in hours or miles driven under a certain set of conditions before failure of the tire. "Tread wear" or "wear susceptibility" is a measure of the tread rubber's ability to withstand abrasive wear in various service applications. "Durable life" can encompass both "durability" and "tread wear" since this term relates to the length of service that may be obtained from a tire; therefore, the limiting factor in the durable life of a tire may be either the tread surface being worn completely away, or structural failure of the tire; while "tire durability" relates to tire life exclusive of wear.

Machines are known to those skilled in the art that measure, or ascertain the degree of imperfectness, or non-uniformity, existent in any given tire. By establishing the magnitude of this imperfectness two different correlations will be found to exist. One of the correlations is between the durability property and the measured imperfectness of the tire; the second correlation is between the rate of tread wear and the measured imperfectness. This correlated data may be employed in tire manufacture as a means of process control to accordingly eliminate any tires which will give inferior and dangerous performance, as well as to enable the manufacturer to pin-point the particular tires that are of inferior quality and accordingly correct the tire manufacturing process to thereby eliminate the cause of the off-quality tires.

There are many published references that list the reasons for imperfectness being existent in tires and it is the consensus of opinion of many authorities that the production of perfect tires is a commercial impossibility. Since the commercial manufacture of perfect tires is not practical, it is expedient of industry to produce tires of varying degrees of imperfectness where the varying degrees of imperfectness that can be tolerated is governed by the severity of operation to which the tire is ultimately subjected. Tires operating at high speeds, for example, are required to be more nearly perfect than tires of low speed application and require a high durability as a first and prime requirement, and reasonable resistance to wear as a secondary requirement.

It should be understood that imperfectness includes ascertaining the lateral and radial force variations existent in a particular tire, as well as any other recognized parameter of non-uniformity. The durable life of the tire includes the wearing properties of the tread wearing compound as well as the actual number of miles, or hours of use, before destruction or failure of tire components occur. It should furthermore be understood that the particular means used to evaluate the tire may include actual road driving the tire on a vehicle, a conventional indoor test wheel, or any other means of ascertaining the durable life properties of the tire.

It is accordingly an object of this invention to provide a non-destructive method by which the durable life of an imperfect tire can be determined.

Another object of this invention is to provide a non-destructive method of determining the irregular wear susceptibility of a tire.

Still another object of this invention is to provide a non-destructive method of accurately controlling the process of tire manufacture, to thereby provide tires of maximum durable life.

A still further object of this invention is to determine the performance of perfect tires of the same type and construction from performance data based on imperfect tires, and to determine the performance of comparable manufactured tires, each having a certain degree of imperfectness such as may be required for a specific type service application.

Still another object of this invention is to provide a means of evaluating the effect brought about by a slight change in the tire manufacture upon the durable life properties of a tire.

Another object of this invention is to enable the determination of wear and durability as influenced by a change in constructional features of the tire and wherein the determination is made by using imperfect tires and adjusting the results of the determination to coincide with the results that would have been obtained from tires of a comparable degree of imperfectness.

An additional object of this invention is to provide a process control for the manufacture of tires whereby the durable life of a tire can be predetermined to thereby eliminate the production or marketing of tires having unacceptable wearing and durability properties.

A still further object of this invention is to provide the tire manufacturer with a method of grading tires that enables segregation of tires of varying imperfectness into categories of tires having durability and/or wear characteristics suitable for different degrees of severity of usage.

A still further object of this invention is to permit a more accurate characterization of wear differences existent between different composition tread compounds of a tire where the tread compounds are placed on the periphery of the tire in such a manner as to permit from two to ten different tread compositions to be tested on each tire body, and where the individual tread arcs are measured for their radial and lateral force variations, as subfunctions of the total radial and lateral force variation of the complete tire, and then determining the proper multiplier to use for each individual tread arc so as to correct each subsequent observed tread loss of each tread arc to the true losses of the tread compound separate and distinct from the tread wear losses due solely to the dynamic flexibility characteristics of each tread arc.

Other objects of this invention will become apparent from the following description and claims:

Figure 4:
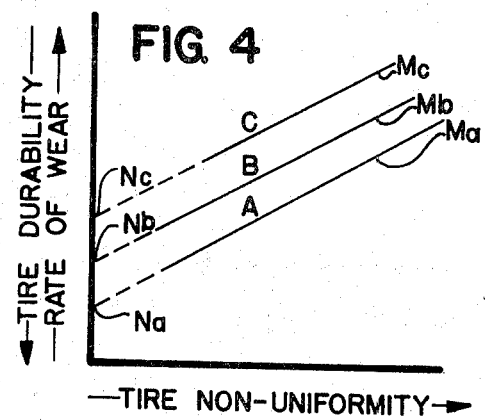

FIG. 4 is a curve showing the effect of tire non-uniformity on the rate of wear of the tread wearing compound as well as the tire durability. Hence FIG. 4 is actually two separate series of curves illustrated in a single figure and showing two separate and distinct relationships; first, the relationship between tire durability and tire non-uniformity; and second, the relationship between tire rate of wear and tire non-uniformity.

Figure 5:
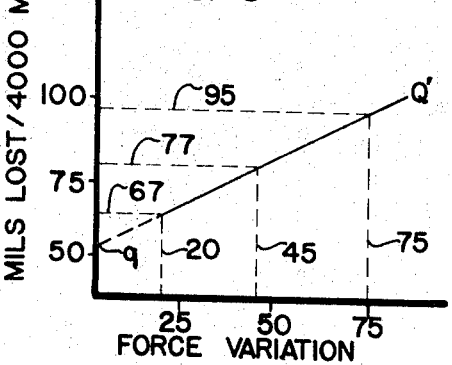

FIG. 5 is a curve illustrating the effect of force variation on the rate of wear of the tread wearing compound.

Figure 6:
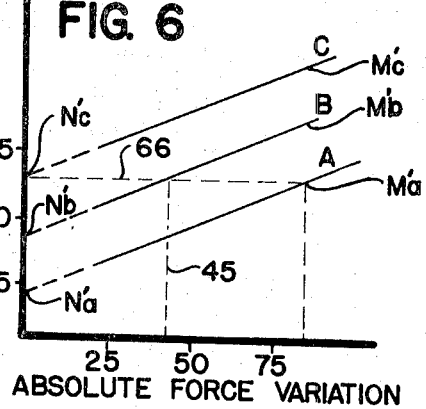

FIG. 6 is a series of curves showing the effect of absolute force variation upon the rates of wear of the tread wearing compounds of three types of tires.

Figure 7:
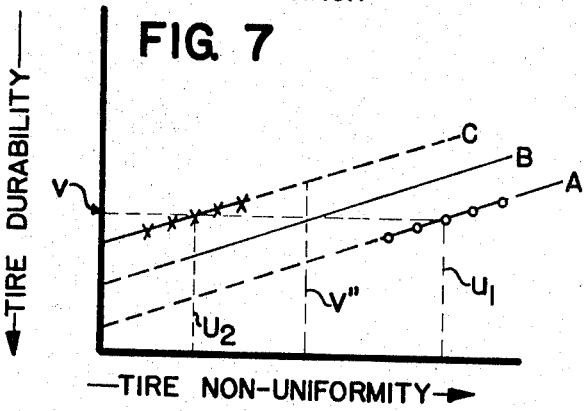

FIG. 7 is a series of curves illustrating the effect of tire non-uniformity upon the durabilities of three types of tires.

The measured imperfections in a tire include imbalance, external radial runout, internal radial runout, loaded radial runout, radial force variation, lateral force variation, and tangential force variation. Radial runout is simply the variation of a tire from a perfect planar circle, both interior and exterior, when the tire is mounted on a dimensionally perfect wheel. Radial and lateral force variation represent measured force variations in the two identified planes as a tire rotates through its 360° cycle. The tangential force variation relates to the variation in force produced between the ground and the ground contacting tread portion of the tire as the tire rotates through is 360° cycle.

The static tire tread footprint contact pressure profile is a partial indicator of the tangential forces generated by the rotating tire against a supporting surface. The tangential force variation, although difficult to measure dynamically, is a major factor in the wear rate of a tire, and especially the variation in wear rate around the tire.

The dynamic flexibility of a tire includes all of the forces present at any given point in a tire and includes the above recited forces. The rate of wear of a tire is directly related to the variation of tangential forces generated by the constantly changing and varying footprint of a tire against the tire contact surface as the tire rotates through its 360° circumference. In the above hypothetical perfect tire, the tangential force between the tire tread and the road surface would be constant and unvarying around its 360° circumference, and accordingly, this idealized tire would exhibit a maximum durable life. Any variation in this otherwise constant tangential force will lower the durable life of the tire as well as causing it to wear at different rates around its 360° of circumference. Lateral and radial force variations cause variations in the tangential forces as reflected by the constantly varying footprint contact profile and configuration. Since the tangential force variation cannot be conveniently measured dynamically, and while the radial and lateral force variations can be measured dynamically, those two latter force variations are used in the analysis of the dynamic flexibilities of a tire, although it would be preferable to use the tangential force variation if such a force could be conveniently measured.

Figure 1:
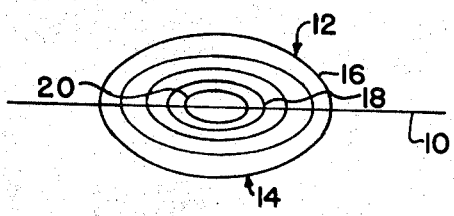
FIG. 1 is a schematical representation of the tangential force gradient exerted by a nearly perfect tire tread footprint contact area onto a normal supporting flat surface.

The tangential forces of an idealized perfect tire are illustrated in FIG. 1, wherein there is seen a tire tread footprint illustrated by lines representing the constant contact pressure points and presumably constant tangential force lines as well. Numeral 10 bisects the tire print and represents the center of the path along which the tire moves. The upper half of the footprint is illustrated by the arrow at numeral 12, the lower half by the arrow at numeral 14, the outermost constant pressure line by numeral 16, and the innermost constant pressure line by numeral 20. The lines of constant pressure points lying between the magnitude illustrated by numerals 16 and 20 are indicated by numeral 18. The lines of constant pressure on each side 12 and 14 are noted to be symmetrical with respect to each other, and accordingly, a tire exhibiting a pressure profile such as illustrated in FIG. 1 would be expected to have a minimum tangential force variation as it rotates through its 360° circumference and accordingly maximum durable life characteristics.

Figure 2:
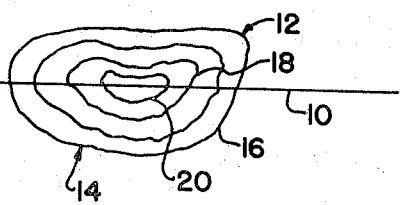
FIG. 2 is a schematical representation of the tangential forces present at the interface between an imperfect tire tread footprint contact area and a flat supporting surface.

FIG. 2 represents a pressure profile of the tangential forces exhibited by an imperfect tire, wherein the tire tread footprint outlined by lines representing the constant contact pressure points are distorted and unsymmetrical with respect to each other. Tires of varying degrees of imperfectness will have constantly changing pressure profiles that depart from FIG. 1 in a manner illustrated by FIG. 2.

Ordinarily produced tires have varying degrees of imperfectness as exemplified by the items identified above. A maximum level of acceptability of major degrees of imperfectness may arbitrarily specify thirty four pounds radial and eleven pounds lateral force variation under certain specified conditions of inflation, applied load, and speed for a 7.75—14 tire for the specific uniformity machine used, for example. The varying levels of arbitrary acceptability may be determined from a performance graph derived from a sufficient sample size to accurately characterize such graph, wherein the magnitude of a specific imperfection is plotted against cumulative percent of total sample for a specific type of service application. In the specified example referred to, the limits fall approximately at the ninety-five percent point of each individual curve of percent of total versus radial force variation and percent of total versus lateral force variation. Thus in the example cited, roughly five to ten percent of commercially produced passenger tires fall outside this specification and would be excluded from the test sample of the marketable tires for the specific type of service application. The point of exclusion, whether by absolute value or by percent of total sample, is determined by empirical means for any type of service application. With reference to the specification of thirty-four and eleven pounds respectively, it is not uncommon to encounter individual tires which may exceed these values by two-to-five-fold. Such structurally deficient tires have a very marked influence upon absolute rate of wear and upon tire durability, and their inclusion in a group of tires to be marketed would lead to early replacement, for they will not perform satisfactorily in the field. Applicant has determined that tires of the specifications identified above wear twenty to forty percent faster than identically constructed structurally perfect tires and that it is not uncommon to encounter tires that wear at a fifty percent faster rate than their structurally perfect counterparts. The degree of wear difference, whether twenty or forty percent, depends upon the manner in which the investigator treats the data in extrapolating to zero imperfection. As stated previously, tires having varying degrees of imperfectness generally have a durable life related to the degree of imperfectness, and in this respect the general analogy may be drawn that tire durability and rate of wear compared to a structurally perfect tire are both adversely affected in direct proportion to the magnitude of the imperfection.

In the above example of a 7.75—14 tire, the normal applied load carried by one tire of a vehicle containing four or five passengers would be about one thousand pounds, hence the tire may be tested for radial and lateral force variation at an applied load of one thousand pounds and under normal inflation pressur at a specified speed. Of one thousand tires sampled, only fifty would normally be expected to show a radial force variation greater than thirty-four pounds, which is 3.4% of the applied load, or conversely ninety-five percent of the tires. Another fifty tires would be expected to show a lateral force variation greater than eleven pounds. Since there is no direct relationship between radial and lateral force variation, the number of unsatisfactory tires being thus eliminated as potentially undesirable may be a minimum of fifty or a maximum of one hundred dependent upon the number of tires being excluded for exceeding the limits of both radial and lateral force variation. These values are predicated upon a threshold acceptance level of thirty four pounds radial or eleven pounds lateral force variation being the dividing line between acceptable and non-acceptable tires for general commercial service. The lateral force variation threshold has been established at about one-third of the radial force variation. Therefore the absolute force variation, for this specific example, has been established as forty-five pounds.

Figure 3:
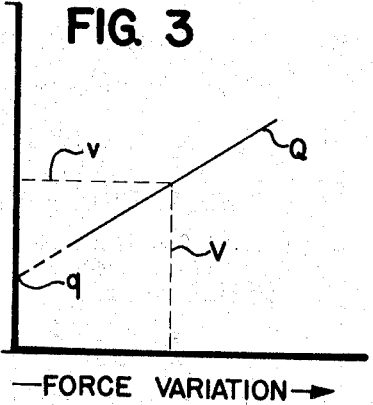
FIG. 3 is a curve illustrating the effect of force variation upon the durability of a tire as measured on an indoor test wheel.

Looking again now at the figures of the drawings wherein the force variations, including the lateral and radial force variation, are plotted against the tire durability and wear susceptibility, there is seen illustrated therein a series of curves showing that as the imperfectness of a tire is increased, the durable life decreases. In FIG. 3, the curve $q$–$Q$ shows that as the force variation increases, the "miles to failure" decreases, as measured on a test wheel. A particular tire having a durable life characterized by the curve $q$–$Q$, and having a measured force variation $V$, would normally run the number of miles or hours represented by $v$. The force variation as used herein includes all the before recited measurable aspects relating to non-uniformity and accordingly includes tangential force variation as reflected by the sum of radial and lateral force variation.

A perfect tire, that is, a tire having zero lateral and radial force variation, has a maximum life expectancy such as exemplified by a point near numeral "N" on the curves A, B, and C of FIG. 4 wherein the three curves represent three different tire constructions. Tire A represents an improved construction over tire B, which in turn is an improvement over tire C as regards wear susceptibility or as regards tire durability. It is emphasized again that absolute wear and absolute durability are entirely different and unrelated parameters when defining or describing the performance characteristics of different construction tires. A specific tire construction might have an exceptionally long wearing tread composition which would rate it as the A tire in FIG. 4 as regards wear susceptibility but at the same time its overall construction characteristics might rate it as the C tire of FIG. 4 as regards its durability characteristic. Similarly, another tire with a fast wearing tread composition, but with exceptional body components and construction features, might be rated a C tire in the wear parameter but an A tire in its ultimate durability. Hence the wear represented by point $Na$, $Nb$, or $Nc$ depicts an amount of wear where the variation in tangential forces are a minimum value and accordingly the dynamic flexibility of the tire are at the minimum values obtained when the idealized constant pressure footprint is at its optimum configuration of FIG. 1. An imperfect tire, that is, a tire having some degree of imperfection, would exhibit a wear rate greater than this minimum value and in proportion to the magnitude of its force variation, or tire nonuniformity, and would fall somewhere between points "N" and "M" of FIG. 4, where "M" represents the maximum wear rate obtained on the tire having the maximum imperfectness that would still be marketable. As the imperfectness, or non-uniformity, of the tire increases, the durability or "miles to failure" decreases in accordance with the curves of FIG. 4. The constantly irregular pressure footprints of such tires throughout their 360° circumference will resemble that illustrated in FIG. 2, wherein the tangential forces, or dynamic flexibility, would be greater than that obtained for the optimum configuration of FIG. 1.

It should be understood that FIG. 4 is actually two separate series of curves illustrated in a single figure and showing two separate and distinct relationships; first, the relationship between tire durability and tire non-uniformity; and second, the relationship between tire rate of wear and tire non-uniformity. Tire durability and rate of wear are directly related only in tires of a given construction; they are not directly related when comparing tires of two or more different constructions.

FIG. 5 illustrates the effect of force variation upon the amount of tread stock abraded away as measured in mils lost/4000 miles driven in a controlled wear performance test. An absolutely perfect tire will wear at a minimum value of fifty-five mils/4000 miles driven, as illustrated by the point $q$ where curve $q$–Q intercepts the ordinate. Tires having any measure of force variation will exhibit a tread loss greater than the minimum value. Tires, as in the previous example of the 7.75—14 tire, having a force variation greater than forty-five pounds (lateral and radial) are usually considered unacceptable for general service application.

The maximum value of acceptance has been arbitrarily set at forty-five pounds force variation, which is the sum of the lateral and radial force variation measured by a specific design of tire uniformity tester. Any tire having a radial or lateral force variation greater than thirty-four and eleven pounds, respectively, is generally considered unacceptable for general service application, although it might be considered to be perfectly adequate for slow speed or town driving.

Curve $q$–Q' of FIG. 5 was obtained in a designed test program in order to characterize the influence of radial and lateral force variation as it influences the particular 7.75–14 tire manufacturer. Each tire, as it is produced, can be measured for its non-uniformity and from the data represented by curve Q' of FIG. 5 the estimated life of the tire as well as its wear potential can be predetermined with accuracy. For example, a tire having a cumulative radial and lateral force variation of twenty pounds absolute will have a tread life as represented in curve Q' of about sixty-seven mils loss for each 4000 miles driven under average driving conditions. For a tread depth designed for 0.33 inch wear on the tread wearing surface, such a tire will ordinarily give a service equivalent of about 19,700 miles normal service. Conversely, the same tire exhibiting a measure seventy-five pounds radial and lateral force variation will give a service of only 13,900 miles, in accordance with curve $q$–Q' of FIG. 5.

It should also be evident that this novel test method may be used in the tire testing industry to examine an imperfect tire by first determining its radial and lateral force variation, testing the tire to determine its imperfect durable life (durability and/or wear susceptibility), and then using the dictionary of stored data represented by FIGS. 4 and 5 to determine, by extrapolation, the durable life (either durability or wear susceptibility) of the same tire had the tire been perfect.

FIG. 6 illustrates a more complex form of FIGS. 4 and 5 wherein the effect of the absolute force variation upon the amount of tread stock abraded away by the road surface is illustrated by the three curves A, B, and C. Curve C represents an inferior grade of tire as regards the ability of the tread stock to withstand abrasive wear. Curve B represents a tire having improved abrasive resistance over tires characterized by curve C, and curve A represents a tire having still further improved abrasive resistance over tires B and C. It is pointed out that the term "tire" is used to designate a particular tire design or construction. As seen in FIG. 6, a perfect tire will have an unusually long tread life, regardless of its design, and will intercept the ordinant somewhere at a low value "N." A highly imperfect tire will wear at a faster rate and thus, at point "M" rate of wear, tires of construction A could have two times the degree of imperfectness compared to tires of construction B and many fold the degree of imperfectness of tires of construction C and still maintain a possible acceptable wear rate.

Since there are no perfect tires, as exemplified by low wear rate "N," and since a tire such as exemplified by fast wear rate "M" are unacceptable, except possibly for extremely light conditions of usage, some reasonable value of acceptance between these two points must be arbitrarily set that enables mass production of tires that are of an acceptable quality to the consumer.

FIG. 7 illustrates a condition wherein experimental data, when not treated according to the concepts of the instant invention, could lead the experimenter to evaluate a poor tire as being equivalent to a superior tire, or vice versa. Curve B characterizes a normal production line tire of a specific design, wherein curve B has been established or characterized by a large number of samples over a wide range of tire non-uniformity. Curve B may be said to be the process control for a particular tire design wherein any defect in a tire will show up as an abnormal increase in the non-uniformity thereof. A tire having a magnitude of imperfectness greater than the $v$ intercept for the V level of imperfectness of tire B is considered unsuitable for general service. Any change in the process of manufacture of tire B will be exemplified as a new curve A or C wherein A represents a desirable change while C represents an undesirable change from the standpoint of durability. A limited number of samples (O) of curve A compared to a limited number of samples $(x)$ of curve C may be used to establish new curves C and A wherein, according to the teachings of this invention, it is readily apparent that the tires of curve C are of inferior design as compared to the tires of curve A. In the absence of a consideration of tire non-uniformity, it would appear that the change in the process of manufacture had no influence upon the tire manufacture since the tire durability at V remains constant for all three tire designs. A consideration of FIG. 7 shows that while the tires $(x)$ and $(o)$ per se, are of the same durability, they are nevertheless of different quality and that the tested tires $(x)$ and $(o)$, when corrected to the non-uniformity level V, represent a decided improvement $(o)$ and a decided lowering in quality $(x)$.

Non-uniformity in truck tires is greater than in passenger tires. This is evident from studies of wear variation measured around the 360° circumference of a large number of whole tread truck and passenger tires. Where the standard deviation of wear variation of one 45° arc of circumference of a passenger tire compared to another 45° arc amounts to between 3.5 to 4% for the above 7.75—14 tire having a forty-five pound combined radial and lateral force variation, the standard deviation of wear variation of a "comparable" truck tire is of the order of 10%. Such a variation in truck tires corresponds to a combined radial and lateral force variation approaching 100 pounds in a passenger tire, which is totally unacceptable for general service passenger car application. Since cross country highway trucks are progressively traveling at faster speeds and hauling heavier loads with the development of larger power plants, the problem of making satisfactory tires for use on these vehicles is becoming more acute. One answer to this problem is to substitute the radial belted truck tire for the more conventional bias constructed tire in order to achieve better durability and better wear resistance; another answer is to decrease the tire body thickness by using larger tire cords and fewer body plies in order to improve the durability. It is evident from the teaching of this invention that conventional truck tires having a minimum of imperfectness will also solve the problem posed by these severe service applications, since such tires will have a maximum durability as well as a maximum resistance to abrasive wear regardless of whether the tires are bias constructed or radial belted.

As pointed out in my co-pending application, Ser. No. 504,727 it is possible to place two to ten different tread compositions to be tested on a single tire body where each of the individual tread arcs or segments may be measured for their radial and lateral force variations. The magnitude of the radial and lateral force variation of each of the individual tread arcs constitutes a subfunction of the total radial and lateral force variation of the entire tire. The tire may then be tested either on an indoor testing wheel or by actual road testing to thereby determine the rate of wear of each individual tread compound or each tread arc. The rate of wear of each individual segment or tread arc is a function of both the tread composition and the non-uniformity of the tire. In accordance with the principles set forth above, a proper multiplier can be determined for each individual tread arc so as to correct each subsequent observed tread loss of each tread arc to the true losses of the tread compound and accordingly ascertain the tread wear or tread losses due solely to the dynamic flexibility characteristics of each tread arc and to determine the tread wear losses due solely to the abrading away of the tread compound by the road surface. By employing a multi-section tread tire in carrying out the wear test, the accuracy of the test is greatly improved, especially where a statistically designed screening wear test is employed.

As further pointed out in my copending application, actual wear testing expense may be greatly reduced by subjecting the tire to a lathing operation wherein a predetermined amount of the outermost tread material is artificially removed, to thereby enable rapid evaluation of the rubber at different tread depths. This expedient of lathing the tire also finds utility in removing radial imperfections caused by the rubber "bunching up" during the vulcanization process; and accordingly, a tire that has a radial force variation that exceeds a predetermined acceptance level may often be reduced to a satisfactory force variation by this operation.

It should be recognized that varying levels of acceptability may be arbitrarily selected in accordance with the aim of a particular manufacturer for a specific type of market or service application. Furthermore, a tire that is acceptable to an average consumer today might be totally unacceptable a few years hence due to a tightening up of manufacturing operations and techniques as industry pushes toward safer tires and as the present road systems are improved so as to permit faster speeds. That is, the specific limits of acceptability set by a manufacturer will usually be governed by the projected use of the tire. For example, a police car operating at one hundred and twenty miles per hour compared to the ordinary vehicle operating up to seventy and eighty miles per hour would require a much more uniform tire with a high durability since structural failure is far more likely to occur under the severe usage of the first vehicle as compared to the latter vehicle. Therefore a tire having a thirty-four pound radial and an eleven pound lateral force variation, used under severe conditions as set forth in the above example, may be totally unsatisfactory for the severe usage exemplified by the first vehicle, but at the same time such a tire may be acceptable for use on the second vehicle.

While specific means for measuring the force variations in the above example has been limited to measuring the lateral and radial force variations on a specific tire uniformity machine, it must be understood that any means of directly or indirectly measuring tire non-uniformity which associates this non-uniformity to the 360° circumference of a tire can be used for predicting variation in wear around the circumference of the tire as well as predicting the absolute rate of wear (which is a function of the idealized minimum rate of wear plus the added wear resulting from the non-uniformity) plus the predicting of the probable durability of the tire.

I claim:

1. A non-destructive method of determining the durable life of a tire comprising the steps of:
   (1) placing the tire on a force variation measuring means to ascertain the radial and lateral force variations exerted by the tread surface of the tire;
   (2) placing each of a series of similar tires on a force variation measuring means to ascertain the radial and lateral force variations exerted by the tread surface of each tire of the series of tires;
   (3) using each tire of the series of tires a sufficient amount to destructively determine the durable life characteristics of each tire of the series of tires;
   (4) storing the data obtained in steps (2) and (3) to thereby provide a dictionary of stored terms which characterizes the effect of lateral and radial force variations on the durable life of the series of tires;
   (5) relating the data obtained in step (1) to the stored data of step (4) in order to obtain the aforesaid non-destructive determination.

2. The method of claim 1 wherein the durable life of said series of tires is ascertained by testing on indoor test wheels.

3. The method of claim 1 wherein the durable life of the series of tires is ascertained by vehicle tests conducted on roadways.

4. The method of claim 1 wherein the results of the determination is used to control the process of manufacture of tires to thereby control the production of non-uniform tires.

5. The method of claim 1, and further including the step of:
   (6) selecting tires in accordance with the results of step (5) to enable providing groups of tires for test purposes wherein said groups of tires have essentially the same degree of non-uniformity to thereby enable a true comparison between the tires of the different test groups.

6. The method of claim 1, and further including the step of:
   (6) selecting tires in accordance with the results of step (5) to thereby enable providing groups of tires wherein each said group exhibits similar degrees of imperfectness;
   (7) providing each tire with indicia identifying the tire with the group to which the tire belongs; whereby:
      a tire may be evaluated and identified to thereby enable it to be placed in service where the severity of usage to which the tire will be subjected does not exceed the durable life capabilities of the tire.

7. A method of determining the durability of a tire comprising the steps of:
   (1) measuring the force variations present in a predetermined number of tires representative of said tire;
   (2) measuring each of said predetermined number of tires to ascertain the effect of said force variations upon the durabilities of said predetermined number of tires;
   (3) storing the data obtained in steps (1) and (2) to thereby provide a dictionary of the effect of said force variations upon durabilities of said predetermined number of tires;
   (4) measuring the non-uniformity of force variations present in said tire:
   (5) comparing the force variations of said tire to said stored data to thereby determine the durability of said tire.

8. The method of claim 7, and further including the steps of:
(6) measuring the durability of said tire;
(7) comparing the results of step (6) with the results of step (3) to thereby determine the durability of said tire for a specific degree of imperfectness other than the actual measured force variation determined in step (4).

9. The method of claim 7, and further including the steps of:
(6) effecting a change in the design of said tire;
(7) determining the durability of said tire;
(8) comparing the results of step (7) with the stored data of step (3) to thereby determine the effect of step (6) upon the process of manufacture of said tires.

10. The method of claim 7 wherein the durability of said predetermined number of tires is ascertained by measuring the tangential forces exerted by the footprint contact profiles of said predetermined number of tires.

11. The method of claim 7, and further including the step of:
(6) selecting tires in accordance with the results of step (5) to enable providing groups of tires for test purposes wherein said tires have the same degree of non-uniformity to thereby enable a true comparison between the tires of the different test groups.

12. The method of claim 7, and further including the steps of:
(6) selecting tires in accordance with the results of step (5) to thereby enable providing groups of tires wherein each said group exhibits similar degrees of imperfectness;
(7) providing each tire with indicia identifying the tire with the group to which the tire belongs; whereby:
a tire may be evaluated and identified to thereby enable it to be placed in service where the severity of usage to which the tire will be subjected does not exceed the durability capabilities of the tire.

13. The method of claim 7 wherein step (2) is ascertained by testing on an indoor test wheel.

14. The method of claim 7 wherein step (2) is ascertained by vehicle tests conducted on roadways.

References Cited
UNITED STATES PATENTS

| | | | |
|---|---|---|---|
| 3,375,714 | 4/1968 | Bottasso | 73—146 |
| 3,382,711 | 5/1968 | Scholl | 73—146 |
| 3,412,615 | 11/1968 | Nedley | 73—146X |
| 3,473,422 | 10/1969 | Leblond | 73—146 |

DONALD O. WOODIEL, Primary Examiner